United States Patent
Okado (10) Patent No.: US 9,762,831 B2
(45) Date of Patent: Sep. 12, 2017

(54) IMAGE SENSOR AND CONTROL METHOD THEREOF, AND IMAGE CAPTURING APPARATUS

(71) Applicant: CANON KABUSHIKI KAISHA, Tokyo (JP)

(72) Inventor: Teruyuki Okado, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/716,990

(22) Filed: May 20, 2015

(65) Prior Publication Data

US 2015/0350574 A1  Dec. 3, 2015

(30) Foreign Application Priority Data

May 27, 2014  (JP) ................................. 2014-109430

(51) Int. Cl.
- *H04N 5/374* (2011.01)
- *H04N 5/378* (2011.01)
- *H04N 5/347* (2011.01)
- *H04N 5/355* (2011.01)

(52) U.S. Cl.
CPC ............. *H04N 5/374* (2013.01); *H04N 5/347* (2013.01); *H04N 5/3559* (2013.01); *H04N 5/378* (2013.01)

(58) Field of Classification Search
CPC ....... H04N 5/3454; H04N 5/378; H04N 5/374
See application file for complete search history.

(56) References Cited

U.S. PATENT DOCUMENTS

2010/0271522 A1*  10/2010  Matsunaga .......... H04N 5/2176
                                                                348/302

FOREIGN PATENT DOCUMENTS

JP          2010-259027 A       11/2010

* cited by examiner

*Primary Examiner* — Twyler Haskins
*Assistant Examiner* — Fayez Bhuiyan
(74) *Attorney, Agent, or Firm* — Cowan, Liebowitz & Latman, P.C.

(57) ABSTRACT

An image sensor comprises: a plurality of pixels; a plurality of column output lines; and a control unit configured to control a signal to be output from pixels selected from the plurality of pixels to the plurality of column output lines, and each of the plurality of pixels includes: a photoelectric conversion portion; a floating diffusion portion for holding charge transferred from the photoelectric conversion portion; and an addition portion to add capacitance to the floating diffusion portion. The control unit controls to add the capacitance to the floating diffusion portion in a case where signals are simultaneously output to the same column line from the selected pixels.

14 Claims, 7 Drawing Sheets

| ISO | Tfd | Cfd | Vfdr | gain |
|---|---|---|---|---|
| 100 | OFF | 1 | 1 | 1 |
| 200 | OFF | 1 | 1/2 | 2 |
| 400 | OFF | 1 | 1/4 | 4 |
| 800 | OFF | 1 | 1/8 | 8 |
| : | : | : | : | : |

FIG. 5B

| ISO | Tfd | Cfd | Vfdr | gain |
|---|---|---|---|---|
| 100 | ON | 2 | 1/2 | 2 |
| 200 | OFF | 1 | 1/2 | 2 |
| 400 | OFF | 1 | 1/4 | 4 |
| 800 | OFF | 1 | 1/8 | 8 |
| : | : | : | : | : |

| ISO | Tfd | Tfd2 | Cfd | Vfdr | gain |
|---|---|---|---|---|---|
| 100 | OFF | OFF | 1 | 1 | 1 |
| 200 | OFF | OFF | 1 | 1/2 | 2 |
| 400 | OFF | OFF | 1 | 1/4 | 4 |
| 800 | OFF | OFF | 1 | 1/8 | 8 |
| : | : | : | : | : | : |

FIG. 7B

| ISO | Tfd | Tfd2 | Cfd | Vfdr | gain |
|---|---|---|---|---|---|
| 100 | ON | ON | 4 | 1/4 | 4 |
| 200 | ON | OFF | 2 | 1/4 | 4 |
| 400 | OFF | OFF | 1 | 1/4 | 4 |
| 800 | OFF | OFF | 1 | 1/8 | 8 |
| : | : | : | : | : | : |

IMAGE SENSOR AND CONTROL METHOD THEREOF, AND IMAGE CAPTURING APPARATUS

BACKGROUND OF THE INVENTION

Field of the Invention

The present invention relates to a technique of mixing signals read out from a plurality of pixels from an image sensor used in an image capturing apparatus, such as a camera, and outputting a mixed signal.

Description of the Related Art

Conventionally, an image capturing apparatus capable of shooting an image at high frame rate by mixing pixel signals and reading out the mixed signals at high speed from an image sensor has been realized. Further, various counter measures to cope with problems that arises when mixing pixel signals have been proposed.

For example, Japanese Patent Laid-Open No. 2010-259027 proposes that, in a case where signals from a plurality of pixels arranged in the same column are simultaneously read out to a vertical output line to mix the pixel signals, a current value on the vertical output line is controlled to an optimum value in accordance with the number of pixels to be mixed. More specifically, the current on the vertical output line is increased in a case where the pixel signals are mixed comparing to a case where the pixel signals are not mixed. Further, as the number of pixels to be mixed is increased, the current on the vertical output line is increased, thereby expanding the optimum range for mixing pixel signals. The reason for changing the current in this manner is that, in a case where an amplitude of a pixel signal, in other words, of a signal on the vertical output line is large and a difference between pixel signals to be mixed is large, circuit current of the pixel producing a larger signal decreases, which prevents the pixel signals from being mixed correctly, and thus it is necessary to compensate for the shortage of current in the vertical output line.

However, in order to optimally mix pixel signals as disclosed in Japanese Patent Laid-Open No. 2010-259027, energy consumption greatly increases.

SUMMARY OF THE INVENTION

The present invention has been made in consideration of the above situation, and is to optimally mix pixel signals on a column output line without increasing energy consumption of an image sensor.

Further, the present invention is to mix pixel signals on the column output line without deteriorating an S/N ratio.

According to the present invention, provided is an image sensor comprising: a plurality of pixels; a plurality of column output lines; and a control unit configured to control a signal to be output from pixels selected from the plurality of pixels to the plurality of column output lines, wherein each of the plurality of pixels includes: a photoelectric conversion portion; a floating diffusion portion for holding charge transferred from the photoelectric conversion portion; and an addition portion to add capacitance to the floating diffusion portion, and wherein the control unit controls to add the capacitance to the floating diffusion portion in a case where signals are simultaneously output to the same column line from the selected pixels.

Further, according to the present invention, provided is the image capturing apparatus comprising: an image sensor disclosed above; and a processing unit configured to process a signal output from the image sensor.

Furthermore, according to the present invention, provided is a control method of an image sensor having a plurality of pixels, a plurality of column output lines, and a control unit configured to control a signal to be output from pixels selected from the plurality of pixels to the plurality of column output lines, wherein each of the plurality of pixels includes a photoelectric conversion portion, a floating diffusion portion for holding charge transferred from the photoelectric conversion portion, and an addition portion to add capacitance to the floating diffusion portion, the method comprising: adding the capacitance to the floating diffusion portion by the addition portion in a case where signals are simultaneously output to the same column output line from the selected pixels.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
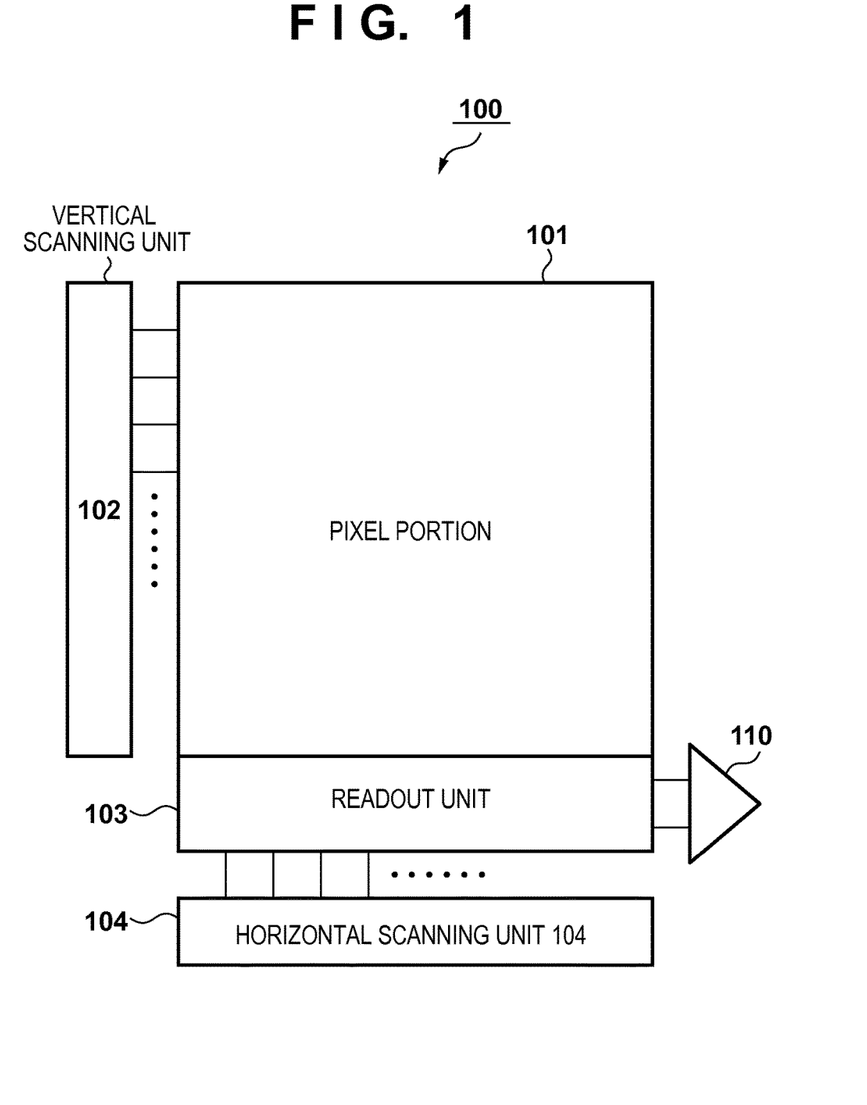
FIG. 1 is a diagram schematically illustrating a configuration of an image sensor according to an embodiment of the present invention.

FIG. 1 is a diagram schematically illustrating the configuration of the image sensor used in an image capturing apparatus according to an embodiment of the present invention. In FIG. 1, an image sensor 100 includes a pixel portion 101, a vertical scanning unit 102, a readout unit 103, a horizontal scanning unit 104, and a differential output unit 110. The pixel portion 101 has a plurality of pixels 200, each having a configuration that will be explained later, arranged in a matrix, and receives an optical image formed by an optical system (not shown).

The image sensor 100 may be provided with a timing generator or the like, for providing a timing signal to each circuit described above.

Figure 2:
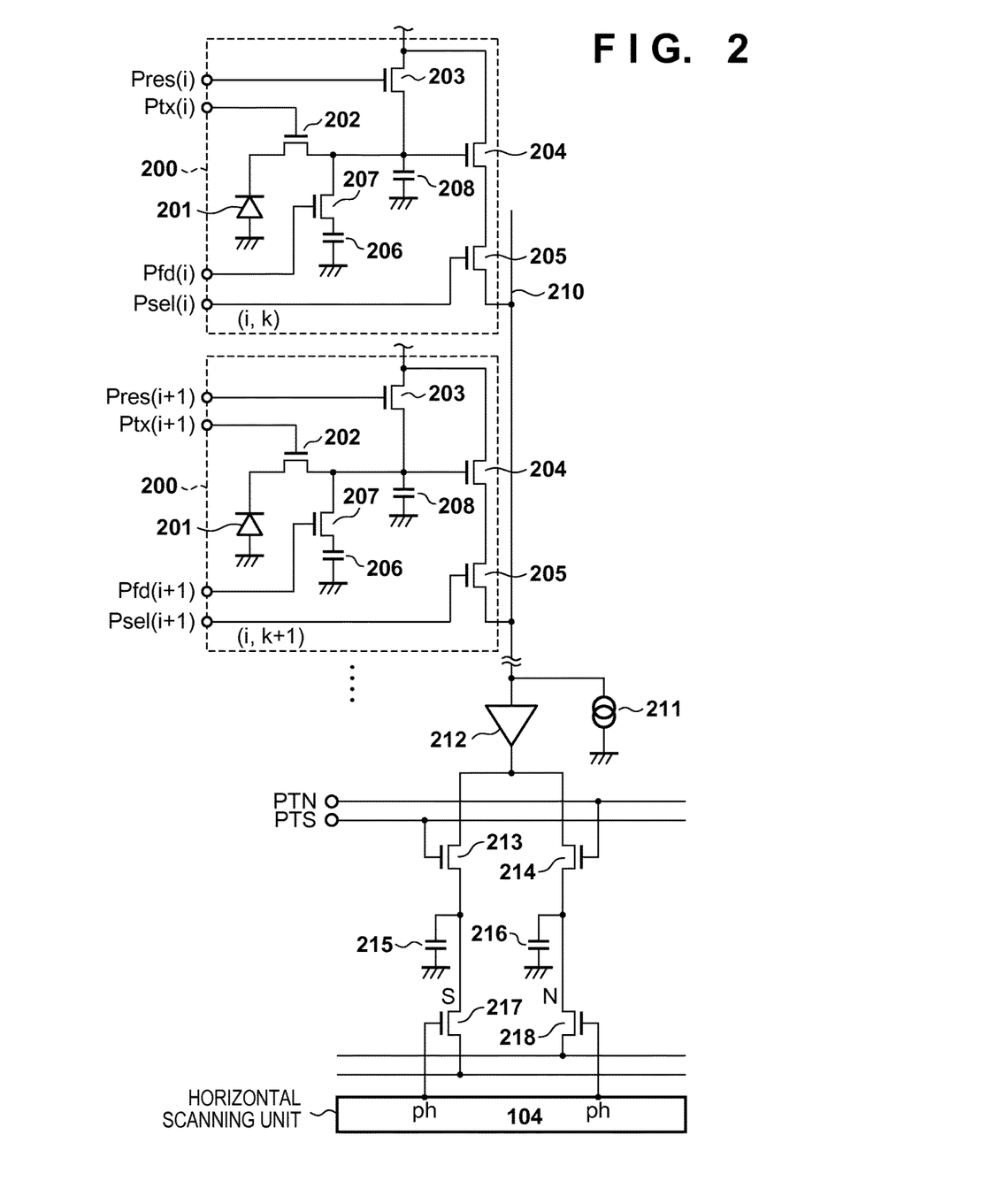
FIG. 2 is a diagram illustrating a configuration of a pixel portion and a readout unit of the image sensor according to the embodiment.

FIG. 2 is a diagram illustrating a configuration of pixels of two rows in one column out of the pixels 200 forming the pixel portion 101, and the readout unit 103 for a column.

A photodiode (PD) 201 generates charge (referred to as "light charge", hereinafter) by performing photoelectric conversion on light entering via the optical system (not shown). A transfer MOS transistor 202 is controlled by a Ptx(n) signal (n is a variable indicating a row number), and transfers the charge generated by the PD 201 to the floating diffusion portion (FD) 208 when it is on. The transferred light charge is temporarily held in the FD 208.

A reset MOS transistor 203 is controlled by a Pres(n) signal, and when it is turned on, the FD 208 is reset by a source voltage VDD. Further, by truing on the reset MOS transistor and the transfer MOS transistor 202 simultaneously, it is possible to reset the PD 201.

The charge held in the FD 208 is output to the column output line 210 via an amplification MOS transistor 204 when a selection MOS transistor 205 controlled by a signal Psel(n) is turned on. The amplification MOS transistor 204 functions as a source follower amp when connected to a vertical output line load 211 via the selection MOS transistor 205.

Further, a capacitor 206 is connected to the FD 208 via a FD addition switch 207 driven by a Pfd(n) signal. By turning on the FD addition switch 207, the capacitor 206 is added and the capacitance of a floating diffusion portion is increased; as a result, it is possible to reduce an amplitude of a signal output from the amplification MOS transistor 204.

The Ptx(n) signal, Pres(n) signal, Psel(n) signal, and Pfd(n) signal are respectively driven by the vertical scanning unit 102 shown in FIG. 1.

A signal output to the column output line 210 is input to the readout unit 103, and amplified by an amplifier 212. At this time, an output (noise signal) from the pixels 200, read out as will be explained later, right after the reset operation is ended is stored in a capacitor 216 via a MOS switch 214 which is controlled by a PTN pulse. Further, a signal obtained as a result of photoelectric conversion of an incident light (referred to as "light signal", hereinafter) is held in a capacitor 215 via a MOS switch 213 which is controlled by a PTS pulse. The noise signal and the light signal read out to the capacitors 216 and 215, respectively, of the readout unit 103 as described above are sequentially selected by a ph signal which is controlled by the horizontal scanning unit 104 on a column-by-column basis, and a signal obtained by taking the difference between the noise signal and the light signal by the differential output unit 110 is output.

The image capturing apparatus applies known processes, including image data generation for recording, to the signal output from the image sensor having the above configuration in a signal processing unit (not shown).

Figure 3A:
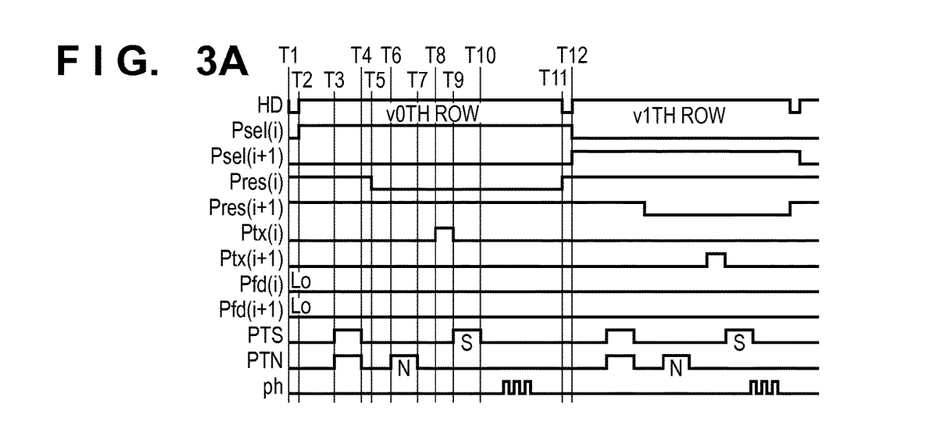
FIGS. 3A to 3C are timing charts for explaining readout operations of an image capturing apparatus according to the embodiment.
Figure 3B:
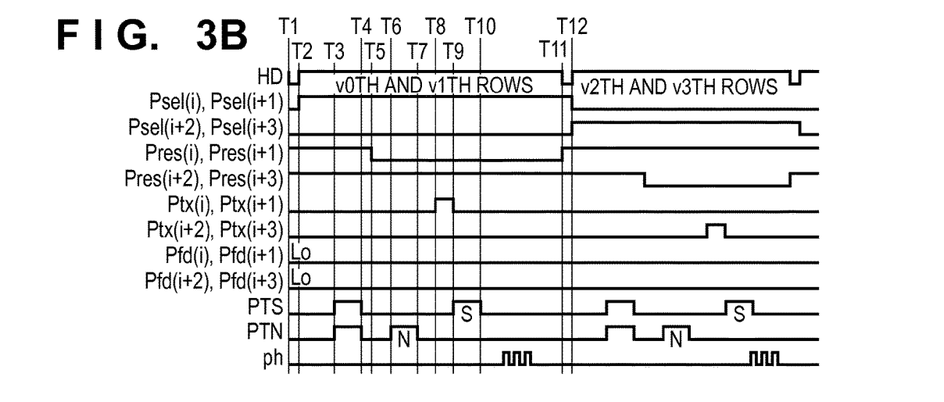
Figure 3C:
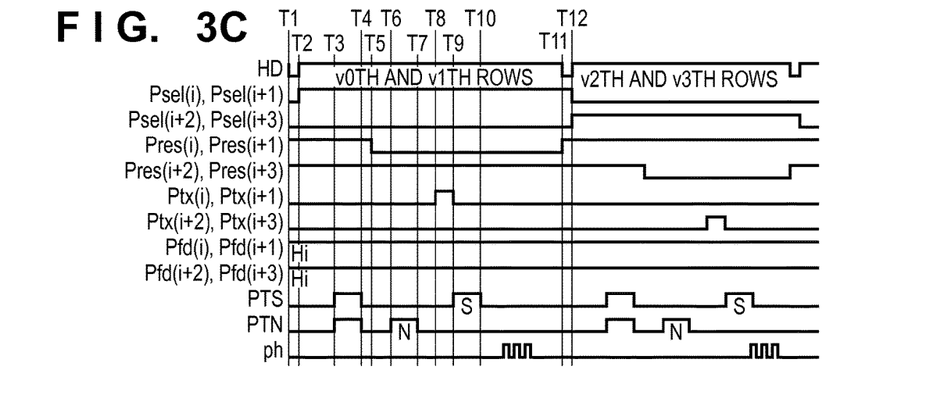

Next, driving method of the image sensor 100 having the above configuration will be explained with reference to timing charts shown in FIGS. 3A to 3C. Here, a case where the pixels 200 in the ith row and the i+1th row are read out from among the pixels 200 arranged in a matrix will be explained. In FIGS. 3A to 3C, the abscissa indicates time. Further, the row number to which each signal is applied is shown in parentheses after each signal name.

FIG. 3A shows an operation for independently reading out signals from the pixels in the ith row and the i+1th row. As shown in FIG. 3A, a HD signal changes from a low level to a high level each time the signals are read out from pixels 200 of one row (i.e., for 1 horizontal period). Further, it is assumed that when each control signal is in a high level, a corresponding transistor or transistors turn on. For the sake of simplicity of explanation, it is assumed that charge accumulation is performed in the PD 201 of each pixel 200 before time T1, and the explanation after time T1 is given below.

In the control shown in FIG. 3A, the Pfd(i) and Pfd(i+1) signals are always in a low level, and thus the FD addition switches 207 are kept off so as not to increase the capacitance of the floating diffusion (FD capacitance is kept to a normal capacitance).

First, at time T2, the HD signal changes from a low level to a high level and the Psel(i) signal becomes a high level, thereby the ith row is selected and the pixels 200 in the ith row are connected to the column output lines 210. At this time, the Pres(i) is in a high level, and the FDs 208 of the pixels 200 in the ith row are reset to the source voltage VDD.

Next, during a period between times T3 and T4, the PTS pulse and the PTN pulse become a high level, which turns on the MOS switches 213 and 214, and the capacitors 215 and 216 are reset. At time T5, the Pres(i) signal becomes a low level, thereby the reset operation of the FDs 208 ends.

Thereafter, during a period between times T6 and T7, the PTN pulse becomes a high level again and the MOS switches 214 are turned on, and an output (noise signal) from the pixels 200 in the ith row after the reset operation is ended is held in the capacitors 216. Next, during a period between times T8 and T9, the PTX(i) signal becomes a high level, and light change is transferred from the PDs 201 to the FDs 208 in all the pixels 200 in the selected row. After that, during a period between times T9 and T10, the PTS pulse becomes a high level again, which turns on the MOS switches 213, and an output (light signal+noise signal) from the pixels 200 in the ith row is held in the capacitors 215.

Thereafter, during a period between times T10 and T11, the light signal+noise signal held in the capacitors 215 and the noise signal held in the capacitors 216 are transferred to the differential output unit 110 provided in the downstream on a column-by-column basis by driving the ph pulse by the horizontal scanning unit 104, and a light signal, which is a difference between the transferred signals, is output.

At time T11, the Pres(i) signal becomes a high level, and at T12, the HD signal changes from a low level to a high level again. At time T12 and on, the Psel(i) signal becomes a low level and the Psel(i+1) signal becomes a high level so as to select the pixels 200 in the next row (here, the i+1th row), and signals of the pixels 200 in the i+1th row are read out in the same manner as the pixels 200 in the ith row. By repeating the aforesaid readout operation on a row-by-row basis, signals are read out from all the pixels 200 of one frame, and thus pixel signals of one frame representing a shot image of a subject can be obtained.

FIG. 3B shows a driving method for mixing signals from the two pixels 200 in the vertical direction (column direction) by simultaneously connecting the pixels 200 of two rows, the ith and i+1th rows, to the column output lines 210, and outputting the resultant signals.

The HD signal changes from a low level to a high level each time signals from the pixels 200 in the two rows (here, the ith row and the i+1th row) to be mixed are read out (i.e., for 1 horizontal period). Further, it is assumed that when each control signal is in a high level, a corresponding transistor or transistors turn on. Here, similarly to FIG. 3A, it is assumed that charge accumulation is performed in the PD 201 of each pixel 200 before time T1, for the sake of simplicity of explanation, and the explanation after time T1 is given below.

It should be noted that in the control in FIG. 3B, the Pfd(i) and Pfd(i+1) signals are also always in a low level, and thus the FD addition switches 207 are kept off so as not to increase the FD capacitance (i.e., kept to a normal capacitance).

First at time T2, the HD signal changes from a low level to a high level and the Psel(i) and Psel(i+1) signals become a high level, thereby the pixels 200 in the ith and i+1th rows are connected to the column output lines 210. At this time, the Pres(i) and Pres(i+1) signals are in a high level, and thus the FDs 208 of the pixels 200 in the ith and i+1th rows are reset to the source voltage VDD.

Next, during a period between times T3 and T4, the PTS pulse and the PTN pulse become a high level, which turns on the MOS switches 213 and 214, and the capacitors 215 and 216 are reset. At time T5, the Pres(i) and Pres(i+1) signals become a low level, thereby the reset operation of the FDs 208 ends.

Thereafter, during a period between times T6 and T7, the PTN pulse becomes a high level again and the MOS switches 214 are turned on, and an output (noise signal) from the pixels 200 in the ith and i+1th rows after the reset operation is ended is held in the capacitors 216. Next, during a period between times T8 and T9, the Ptx(i) and Ptx(i+1) signals become a high level, and light charge is transferred from the PDs 201 to the FDs 208 in all the pixels 200 in the selected rows (here, the ith and i+1th rows). After that, during a period between times T9 and T10, the PTS pulse becomes a high level again, which turns on the MOS switches 213, an output (light signal and noise signal) from the pixels 200 in the ith and i+1th rows is held in the capacitors 215.

Thereafter, during a period between times T10 and T11, the light signal+noise signal held in the capacitors 215 and the noise signal held in the capacitors 216 are transferred to the differential output unit 110 provided in the downstream on a column-by-column basis by operating the Ph pulse by the horizontal scanning unit 104, and a light signal, which is a difference between the transferred signals, is output.

At time T11, the Pres(i) and Pres(i+1) signals become a high level, and at time T12, the HD signal changes from a low level to a high level again. After time T12 and on, the Psel(i) and Psel(i+1) signals become a low level, and the Psel(i+2) and Psel(i+3) signals become a high level so as to select the pixels 200 in the next two rows (here, the i+2th and i+3th rows). Then, signals of the pixels 200 in the next two rows are readout in the same manner as the pixels 200 in the ith and i+1th rows. By repeating the mixing of the pixel signals and reading of the mixed signals, signals are read out from all of the pixels 200 of one frame, and thus it is possible to obtain a frame of pixel signals each made from signals of two pixels mixed in the vertical direction (column direction) representing a shot image of a subject.

Similarly to FIG. 3B, FIG. 3C shows a driving method for mixing signals from the two pixels 200 in the vertical direction (column direction) by simultaneously connecting the pixels 200 of two rows, the ith and i+1th rows, to the column output lines 210, and outputting the resultant signals. A difference between FIGS. 3B and 3C is that the Pfd(i) signal and the Pfd(i+1) signal are kept in a high level, namely, the FD addition switches 207 are on, thereby the FD capacitance is increased. Operation timing of other signals are the same as those shown in FIG. 3B, and thus the explanation thereof is omitted.

Figure 4A:
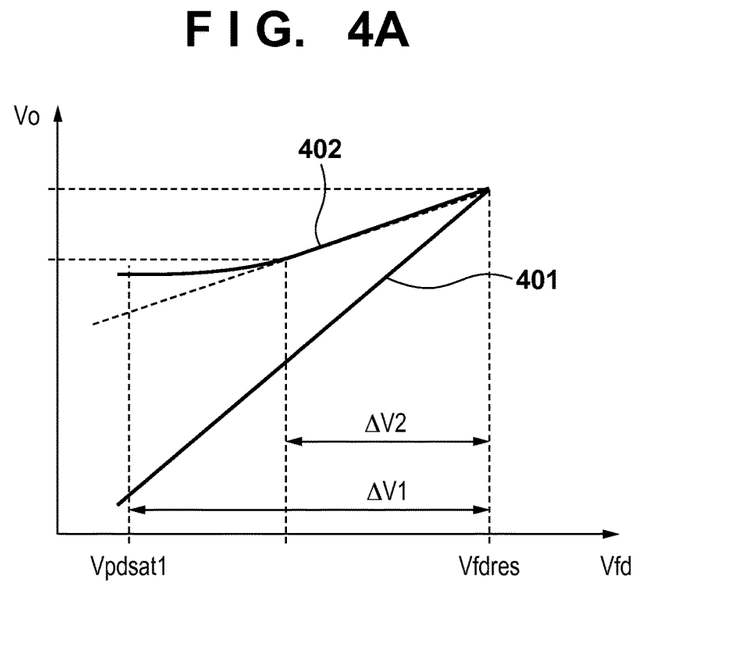
FIGS. 4A and 4B are diagrams for explaining change in voltage at the time of mixing pixel signals in the image capturing apparatus according to the embodiment.
Figure 4B:
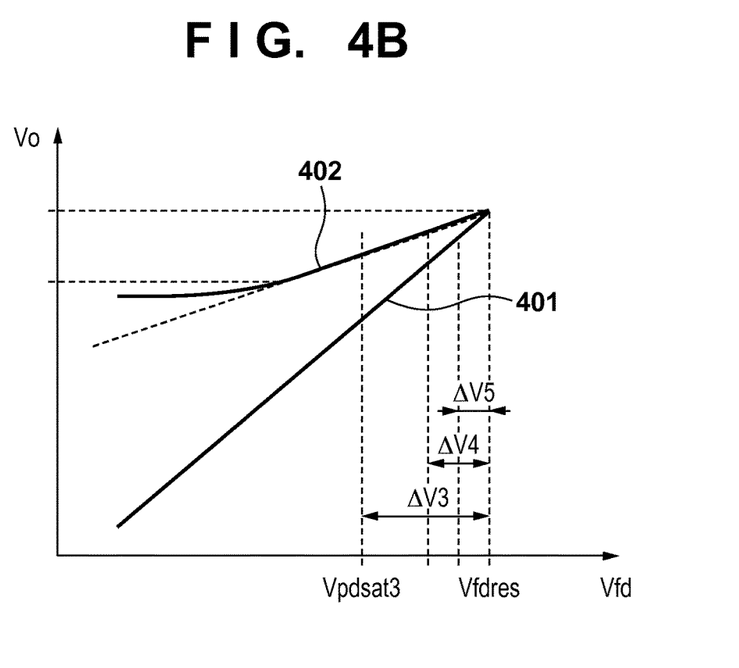

FIGS. 4A and 4B show graphs of voltage Vo of a column output line 210 with respect to voltage (FD voltage) Vfd of a floating diffusion portion. The abscissa indicates the FD voltage Vfd, and the ordinate indicates the voltage Vo of the column output line 210. In FIGS. 4A and 4B, an explanation will be given of under assumption that in a case where signals are mixed and read out by two pixels 200 when the pixels 200 receive light from a high-contrast subject, one of the two pixels 200 receives light and the other pixel 200 does not receive light at all.

A line 401 shows relationship between the FD voltage Vfd and the voltage Vo of the column output line 210 in a case where only the pixel 200 which receives light is connected to the column output line 210. A curve 402 shows relationship between the FD voltage Vfd of the pixel 200 which receives light and the voltage Vo of the column output line 210 in a case where the pixel 200 which receives light and the pixel 200 which does not receive light are simultaneously connected to the column output line 210 to mix the pixel signals.

FIG. 4A shows a case in which signals of two pixels 200 in the vertical direction (column direction) are mixed and outputted by the operation explained with reference to FIG. 3B. As shown by the line 401, in the pixel 200 that receives light, the voltage Vo of the column output line 210 linearly changes within a range ($\Delta V1$) between Vfdres which is a reset voltage of the FD voltage Vfd and Vpdsatl which is the FD voltage Vfd when the PD is saturated and charge is transferred.

By contrast, the curve 402 showing a case in which pixel signals are mixed is ideally supposed to be a straight line having ½ of the tilt of the line 401 if signals from the two pixels 200 are properly mixed. However, the curve 402 starts to bent around a point where the FD voltage Vfd of the pixel 200 which receives light changes by $\Delta V2$ from the FD reset voltage Vfdres as an infection point, and eventually stops to change as described in Japanese Patent Application Laid-Open No. 2010-259027. In other words, in the bent part of the curve 402, the signals are not mixed properly.

Accordingly, in order to properly mix signals from the two pixels 200, it is desirable to drive within a range, as shown in FIG. 4B, where linearly is sufficiently secured. More specifically, the range is between the FD reset voltage Vfdres and a FD voltage when charge is transferred from a saturated PD, where the FD voltage Vfd of the pixel 200 changes by Vpdsat3 ($\Delta V3$).

As explained with reference to FIG. 3C, in a case where two pixel signals are to be mixed, the Pfd(n) signal is set to a high level to keep the FD addition switch 207 on, thereby it is possible to increase the FD capacitance. By doing so, it is possible to reduce a changing range of the FD voltage to a range of $\Delta V3$ shown in FIG. 4B.

Meanwhile, an image capturing apparatus such as a regular camera or the like generally has a function for changing a gain (ISO sensitivity setting) of an amplification unit provided downstream in accordance with a luminance of a subject to be shot. For example, a control is made such that, in a case of shooting a bright subject, a low sensitivity, such as ISO100, is set and the gain is decreased, whereas, in a case of shooting a dark subject, a high sensitivity, such as ISO1600, is set and the gain is increased. If the output range of a voltage after amplified by the gain in the amplification unit is constant independent of the ISO sensitivity, the voltage range (FD voltage range) of a floating diffusion portion is large when a low sensitivity is set, and the FD voltage range is small when a high sensitivity is set.

In a case where the ISO sensitivity is changed when the signals of two pixels 200 in the vertical direction (column direction) are mixed by the operation shown in FIG. 3C, the FD voltage range is as shown in FIG. 4B. For example, the FD voltage ranges for ISO100, ISO200 and ISO400 are $\Delta V3$, $\Delta V4$ and $\Delta V5$, respectively, where $\Delta V3=2\times\Delta V4=4\times$ ΔV5. It is known that the light charge transferred from the PD decreases as the FD capacitance increases, and an S/N ratio deteriorates especially when high ISO sensitivity is set.

Therefore, it is possible to prevent the S/N ratio from deteriorating when high ISO sensitivity is set by limiting the operation for increasing the FD capacitance as shown in FIG. 3C to be performed to when low ISO sensitivity is set, and by performing the operation for not increasing the FD capacitance as shown in FIG. 3B when other ISO sensitivity is set. Although the FD voltage range is widened when the high ISO sensitivity is set, it is possible to properly mix signals output from the two pixels in the vertical direction (column direction) within a range where linearity of the voltage Vo of the column output line 210 can be secured.

Figure 5A:
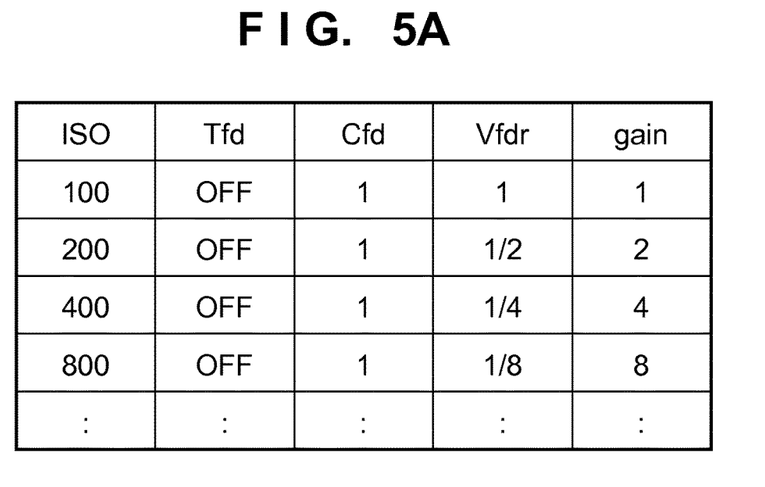
FIGS. 5A and 5B are diagrams showing image shooting conditions and settings in the image capturing apparatus according to the embodiment.
Figure 5B:
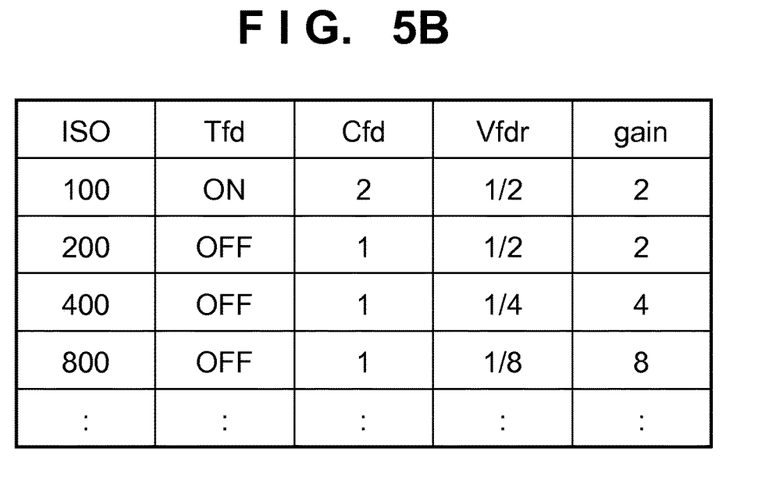

Examples of combinations of the ISO sensitivity, FD capacitance, and gain of the amplification unit arranged downstream are shown in FIGS. 5A and 5B. In FIGS. 5A and 5B, "ISO" indicates ISO sensitivity, "Tfd" indicates on/off of the FD addition switch 207 driven by the Pfd signal, and "Cfd" indicates a ratio of total FD capacitance. In a case where the FD addition switch 207 is off (i.e., Tfd=OFF), the capacitor 206 is not connected and thus the total FD capacitance is ×1, and in a case where the FD addition switch 207 is on (i.e., Tfd=ON), the capacitor 206 is connected and thus the total FD capacitance becomes ×2. "Vfdr" indicates a ratio of the FD voltage range at the time of shooting a subject, and "gain" indicates a gain of the amplification unit arranged downstream. Here, the capacitance of the FD 208 and the capacitance of the capacitor 206 are assumed to be the same.

For all of the combinations shown in FIG. 5A, the FD addition switch 207 is off (Tfd=OFF) for every ISO sensitivity. These settings are used in an image shooting operation in a case where it is determined that the pixel signals are not mixed since the FD voltage range especially in the low ISO sensitivity is large (for example, a moving image shooting at a low frame rate, a still image shooting, and so forth). For example, the ratio Vfdr of the FD voltage range in ISO100 is 1 and the gain at that time is 1, by contrast, the ratio Vfdr of the FD voltage range in ISO200 is ½ and the gain at that time is 2.

In the operation shown in FIG. 5B, the FD addition switch 207 is turned on (Tfd=ON) only in a case where ISO100 is set in order to double the FD capacitance and halve the FD voltage range. In other ISO sensitivities, the FD addition switch 207 is set to off (Tfd=OFF). These settings are used in an image shooting operation in a case where it is determined that the pixel signals are to be mixed (for example, a moving image shooting at a high frame rate in which all pixel readout is not possible, and so forth). The ratio Vfdr of the FD voltage range in ISO100 is set to ½ and the gain at that time is set to ×2. For other ISO sensitivities, the same operation as those of FIG. 5A is performed.

In a case where pixel signals are to be mixed, as shown in FIG. 5B, the set ISO sensitivity is determined, and in the low ISO sensitivity, it is possible to optimally mix pixel signals by increasing the FD capacitance and amplifying a signal corresponding to a decreased portion of the FD voltage range. Further, since the FD capacitance is not increased in the other ISO sensitivities (high ISO sensitivities), it is possible to obtain pixel signals of a high S/N ratio.

<Modification>

Figure 6:
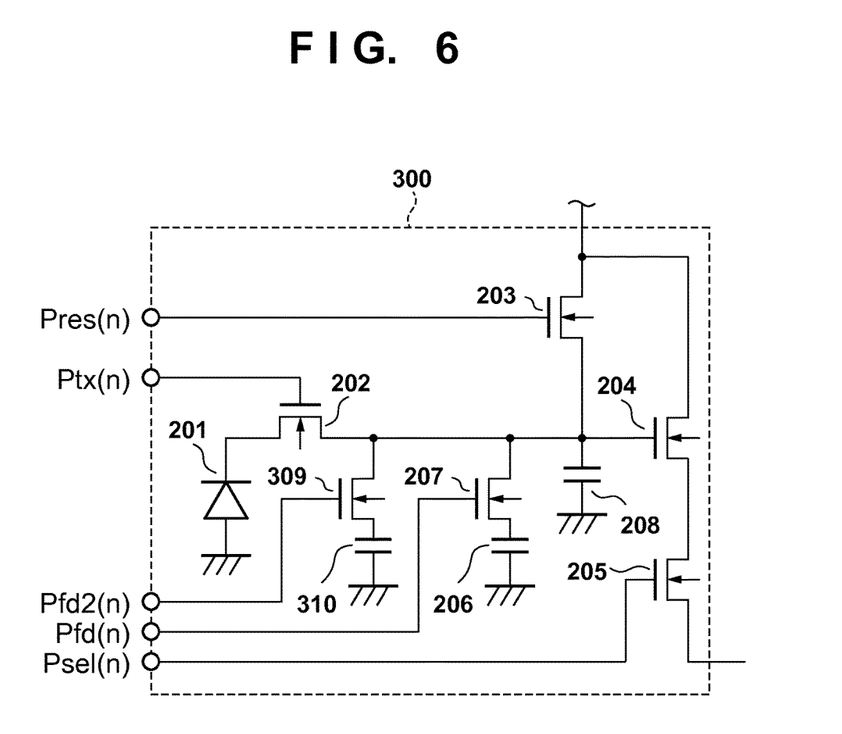
FIG. 6 is a diagram illustrating a configuration of the pixel portion of the image sensor according to a modification of the embodiment.

FIG. 6 is a diagram illustrating an equivalent circuit diagram of a pixel 300 of the image sensor according to a modification of the embodiment of the present invention. In FIG. 6, the same constituents as those shown in FIG. 2 are referred to by the same reference numerals. The difference between the pixel 300 shown FIG. 6 and the pixel 200 shown in FIG. 2 is that a second capacitor 310 is connected to the FD 208 via a second FD addition switch 309 which is driven by a Pfd2 signal. By turning on the second FD addition switch 309, it is possible to increase a FD capacitance, and to decrease an amplitude of a signal output from the pixel 300. Note that the Pfd2 signal is also driven by the vertical scanning unit 102 shown in FIG. 1.

Figure 7A:
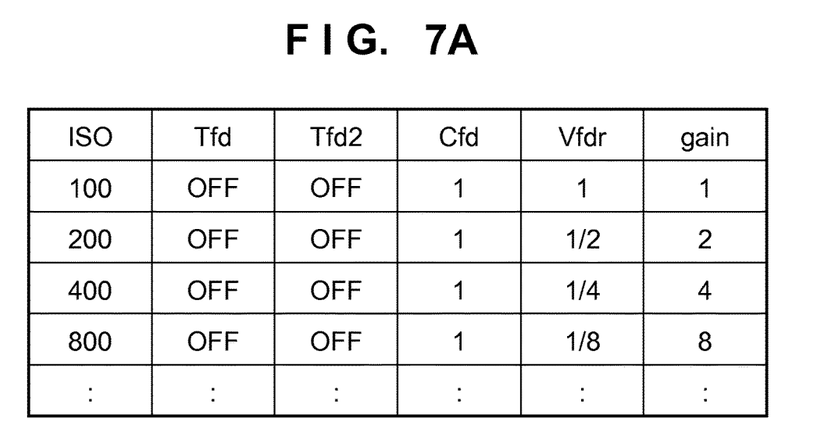
FIGS. 7A and 7B are diagrams showing image shooting conditions and settings in the image capturing apparatus according the modification of the embodiment.
Figure 7B:
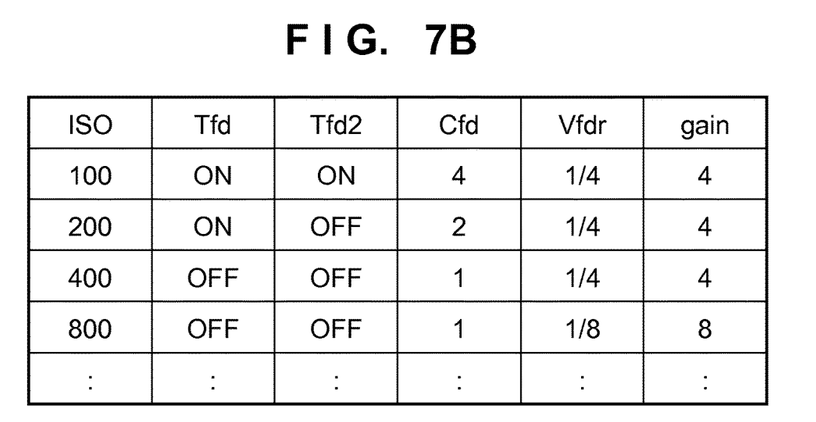

The operating method of the image sensor 100 comprising the pixels 300 having the structure as shown in FIG. 6 is explained for each ISO sensitivity with reference to FIGS. 7A and 7B. In the table shown in FIGS. 7A and 7B, "Tfd2" for indicating ON/OFF of the second FD addition switch 309 driven by the Pfd2 signal is added. Here, the capacitance of the second capacitor 310 is twice as large as the capacitance of the FD 208 and the capacitor 206.

When both of the FD addition switch 207 and the second FD addition switch 309 are off (Tfd=OFF, Tfd2=OFF), the capacitors 206 and 310 are not connected, and the total FD capacitance is ×1. When the FD addition switch 207 is on (Tfd=ON) and the second FD addition switch 309 is off (Tfd2=OFF), the capacitor 206 is connected but the capacitor 310 is not connected, therefore the total FD capacitance becomes ×2. Further, when both of the FD addition switch 207 and the second FD addition switch 309 are on (Tfd=ON, Tfd2=ON), the capacitors 206 and 310 are connected, and the total FD capacitance becomes ×4. "Vfdr" indicates a ratio of the FD voltage range when shooting a subject, and "gain" indicates a gain of the amplification unit arranged downstream.

In the combinations shown in FIG. 7A, the FD addition switch 207 and the second FD addition switch 309 are off (Tfd=OFF, Tfd2=OFF) for every ISO sensitivity. This operation is used in an image shooting in a case where it is determined that pixel signals are not mixed since the FD voltage range is large especially in a low ISO sensitivity (for example, a moving image shooting at low frame rate, a still image shooting, and so forth). For example, in ISO100, the ratio Vfdr of the FD voltage range is 1 and the gain at that time is ×1, and in ISO200, the ratio Vfdr of the FD voltage range is ½ and the gain at that time is ×2.

In the operation shown in FIG. 7B, both of the FD addition switch 207 and the second FD addition switch 309 are turned on (Tfd=ON, Tfd2=ON) in a case of ISO100, thereby the FD capacitance is increased by ×4, and the ratio Vfdr of the FD voltage range is set to ¼. Further, in a case of ISO200, the FD addition switch 207 is turned on (Tfd=ON) and the second FD addition switch 309 is turned off (Tfd2=OFF), thereby the FD capacitance is increased by ×2, and the ratio Vfdr of the FD voltage range is set to ¼. In the other ISO sensitivities, both of the FD addition switch 207 and the second FD addition switch 309 are turned off (Tfd=OFF, Tfd2=OFF).

The operation as shown in FIG. 7B is performed in an image shooting in a case where it is determined that pixel signals are to be mixed (for example, a moving image sensing at a high frame rate in which all pixel readout is not possible, and so forth). Especially, this operation is very effective in an image sensor having an especially small FD capacitance in a case where an extra FD capacitance is not added. In this example, in ISO100, the ratio Vfdr of the FD voltage range is ¼ and the gain at that time is ×4. Further, in ISO200, the ratio Vfdr of the FD voltage range is ¼ and the gain at that time is ×4, and in other ISO sensitivities, the same operation as that of FIG. 7A is performed.

By operating an image sensor 100 as shown in FIG. 7B, in a case where pixel signals are mixed in the image sensor 100 having a particularly small FD capacitance, the FD capacitance is increased when a low ISO sensitivity is set and a portion corresponding to a reduced amount of the FD voltage range is amplified in downstream, it is possible to optimally mix pixel signals. Further, since the FD capacitance is not increased in other ISO sensitivities (high ISO sensitivities), it is possible to obtain a pixel signal of a high S/N ratio.

Note that in the above embodiment and modification, pixels whose pixel signals are added are two successive pixels as shown in FIG. 2, however, the present invention is not limited thereto. For example, the present invention is applicable to a case where signals from two or more same color pixels in the Bayer arrangement are mixed.

Further, the selection MOS transistor 205 is used in FIGS. 2 and 6, however, the present invention is not limited thereto. For example, other circuit structures capable of activating the amplification MOS transistor 204 to output to the column output line 210 may be used.

Furthermore, in FIGS. 2 and 6, the sources of addition switch 207 and the second FD addition switch 309 are connected to the capacitors 206 and 310 whose other terminals are grounded, however, parasitic capacitance may be used instead if the parasitic capacitance is large enough to realize the present invention.

Further, as shown in FIG. 6 for explaining the modification, by further adding a FD addition switch and a capacitor and appropriately controlling on/off of a FD addition switch, it is possible to mix pixel signals more appropriately.

Further, in the above embodiment and modification, it is assumed that pixel signals are mixed and read out, and the FD capacitance is increased in a case of low ISO sensitivity (a predetermined capacitance or less). However, it is possible to configure the pixel 200 or 300 such that the FD capacitance is increased in a case where pixel signals are to be mixed and read out regardless of the ISO sensitivity.

Further, in the above embodiment and modification, whether or not to increase the FD capacitance is controlled by taking the ISO sensitivity as a condition for the operation, however, the present invention is not limited to the ISO sensitivity, and can be controlled on the basis of the brightness of a subject. In this case, when the photometry value is larger than a predetermined value and the variation of voltage across the FD 208 does not fall within the range ΔV3 in FIG. 4B, it may be considered to control the FD capacitance being increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-109430, filed on May 27, 2014, which is hereby incorporated by reference herein in its entirety.

What is claimed is:

1. An image sensor comprising:
   a plurality of pixels each including:
      a photoelectric conversion portion;
      a floating diffusion portion which holds charge transferred from the photoelectric conversion portion;
      an addition capacitor; and
      a connection switch which connects the additional capacitor to the floating diffusion portion;
   a plurality of column output lines; and
   a controller which controls the connection switch to connect the additional capacitor to the floating diffusion portion in a case where signals are simultaneously output to the same column output line of the plurality of column output lines from pixels selected from the plurality of pixels.

2. The image sensor according to claim 1, wherein the connection switch is provided between the floating diffusion potion and the additional capacitor.

3. The image sensor according to claim 1, wherein the controller controls the connection switch to connect the additional capacitor to the floating diffusion portion in a case where a predetermined condition is satisfied.

4. The image sensor according to claim 3, wherein the predetermined condition includes a condition which a set sensitivity is equal to or less than a predetermined sensitivity.

5. The image sensor according to claim 3, wherein the predetermined condition includes a condition in which a brightness of a subject is brighter than a predetermined brightness.

6. The image sensor according to claim 1, wherein the each of the pixels includes a plurality of additional capacitors and a plurality of connection switches.

7. The image sensor according to claim 6, wherein the controller controls to connect more additional capacitors to the floating diffusion portion in a case where a brightness of a subject is brighter than a predetermined brightness than in a case where the subject is darker than the predetermined brightness.

8. The image sensor according to claim 1, wherein the controller controls to connect the additional capacitor to the floating diffusion portion by the connection switch before transferring charge from the photoelectric cot version portion to the floating diffusion portion.

9. An image capturing apparatus comprising:
   an image sensor comprising:
      a plurality of pixels each including:
         a photoelectric conversion portion;
         a floating diffusion portion which holds charge transferred from the photoelectric conversion portion;
         an addition capacitor; and
         a connection switch which connects the additional capacitor to the floating diffusion portion;
      a plurality of column output lines; and
      a controller which controls the connection switch to connect the additional capacitor to the floating diffusion portion in a case where signals are simultaneously output to the same column output line of the plurality of column output lines from pixels selected from the plurality of pixels; and
   a processor which processes a signal output from the image sensor.

10. The image capturing apparatus according to claim 9, further comprising an amplification an amplifier which amplifies the signal output from the image sensor,
   wherein the amplifier changes its gain in accordance with increased capacitance of the floating diffusion portion and the additional capacitor in a case where the connection switch connects the additional capacitor to the floating diffusion portion under control of the controller.

11. The image capturing apparatus according to claim 9, wherein the image capturing apparatus is capable of performing a still image shooting and a moving image shooting, and in a case where a moving image shooting is performed at a frame rate at which all pixel readout is impossible, the control unit controls to simultaneously select two or more pixels and output signals from the selected pixels.

12. A control method of an image sensor having a plurality of column output lines and a plurality of pixels including a photoelectric conversion portion, a floating diffusion portion which holds charge transferred from the photoelectric conversion portion, an addition capacitor, and a connection switch which connects the additional capacitor the floating diffusion portion, said method comprising:

connecting the additional capacitor to the floating diffusion portion by the connection switch in a case where signals are simultaneously output to the same column output line of the plurality of column output lines from pixels selected from the plurality of pixels.

13. The method according to claim 12, further comprising judging whether or not a set sensitivity is equal to or less than a predetermined sensitivity, wherein the connecting step connects the additional capacitor to the floating diffusion portion by the connection switch in a case where the set sensitivity is equal to or less than the predetermined sensitivity.

14. The method according to claim 12, further comprising judging whether or not a brightness of a subject is equal to or brighter than a predetermined brightness, wherein the connecting step connects the additional capacitor to the floating diffusion portion by the connection switch in a case where the subject is equal to or brighter than the predetermined brightness.

* * * * *